United States Patent
Munch

[19]

[11] Patent Number: 6,087,598

[45] Date of Patent: Jul. 11, 2000

[54] WEIGHT SENSING APPARATUS FOR VEHICLE SEAT

[75] Inventor: Carl A. Munch, Troy, Mich.

[73] Assignee: TRW Inc., Lyndhurst, Ohio

[21] Appl. No.: 09/243,917

[22] Filed: Feb. 3, 1999

[51] Int. Cl.[7] ............................ G01G 19/52; G01G 3/14; B60K 28/00; B60R 21/32
[52] U.S. Cl. .................. 177/144; 177/210 EM; 177/DIG. 5; 180/273; 280/735
[58] Field of Search ................ 177/210 R, 210 EM, 177/144, 136, DIG. 5; 73/862.626, 862.69, 779; 180/273; 280/735

[56] References Cited

U.S. PATENT DOCUMENTS

| | | | |
|---|---|---|---|
| Re. 32,746 | 9/1988 | Nelson et al. ............................. | 73/779 |
| 3,090,226 | 5/1963 | Corti et al. ............................ | 73/862.69 |
| 3,218,445 | 11/1965 | Fluegel ................................ | 73/862.69 |
| 3,263,496 | 8/1966 | Fathauer .............................. | 73/862.69 |
| 3,672,699 | 6/1972 | De Windt .............................. | 280/735 |
| 3,968,850 | 7/1976 | Gaskill ............................ 177/210 EM |
| 4,405,025 | 9/1983 | Yanagita et al. .................. 177/210 FP |
| 4,422,341 | 12/1983 | Espiritu Santo et al. ........... | 73/862.69 |
| 4,717,874 | 1/1988 | Ichikawa et al. ....................... | 324/208 |
| 4,857,824 | 8/1989 | Tew ........................................ | 324/208 |
| 4,906,924 | 3/1990 | Zannis ............................... | 324/207.18 |
| 4,916,391 | 4/1990 | Doerman et al. .................. | 324/207.18 |
| 4,917,197 | 4/1990 | Waite, Jr. ............................. | 177/210 R |
| 5,229,715 | 7/1993 | Niino et al. ........................ | 324/207.15 |
| 5,670,876 | 9/1997 | Dilger et al. ....................... | 324/207.13 |
| 5,864,295 | 1/1999 | Jarocha ................................. | 180/273 |

*Primary Examiner*—Randy W. Gibson
*Attorney, Agent, or Firm*—Tarolli, Sundheim, Covell, Tummino & Szabo L.L.P.

[57] ABSTRACT

A weight sensor (10) senses a load applied to a vehicle seat (12). The sensor includes a first mounting member (40; 120) and a second mounting member (42; 122) positioned opposite from and movable relative to the first mounting member (40; 120). A pair of spaced apart and opposed guide elements (44 and 46; 132 and 134) are connected between the first and second mounting members (40 and 42; 120 and 122), respectively. The pair of guide elements (44 and 46; 132 and 134) guide relative movement between the first and second mounting members (40 and 42; 120 and 122). Biasing means (44 and 46; 132 and 134) are provided for urging a spaced apart relationship between the first and second mounting members (40 and 42; 120 and 122). A variable reluctance sensor (90; 150) is operatively positioned between the first and second mounting members (40 and 42; 120 and 122) and has a variable reluctance condition responsive to the relative spacing between the first and second mounting members (40 and 42; 120 and 122) and indicative of the applied load in the seat.

11 Claims, 4 Drawing Sheets

WEIGHT SENSING APPARATUS FOR VEHICLE SEAT

TECHNICAL FIELD

The present invention relates to a weight sensing apparatus for sensing a load applied to a vehicle seat.

BACKGROUND OF THE INVENTION

Numerous types of weight sensing devices have been developed for determining the weight of a load applied to a vehicle seat. One type of weight sensing device is mounted within the seat cushion of a vehicle seat. Another type of sensing device is mounted between the seat and the vehicle body. Typically, a transducer is used to convert a load applied to the seat into an electrical signal indicative of the applied load.

SUMMARY OF THE INVENTION

The present invention is directed to a weight sensing apparatus for sensing a load applied to a vehicle seat. The apparatus includes a first mounting member mountable to the vehicle seat and a second mounting member mountable to the vehicle and positioned opposite and movable relative to the first mounting member in response to a load applied to the vehicle seat. A pair of spaced apart and opposed guide elements are connected between the first and second mounting members. The pair of guide elements guide relative movement between the first and second mounting members. Biasing means are connected between the first and second mounting members for urging a spaced apart relationship between the first and second mounting members. A sensor element is positioned between the first and second mounting members separate from the first and second guide elements. The sensor element has a variable reluctance condition responsive to the relative spacing between the first and second mounting members. The sensor element provides a signal indicative of the applied load in response to the reluctance condition.

BRIEF DESCRIPTION OF THE DRAWINGS

The foregoing and other features and advantages of the invention will become more apparent to one skilled in the art upon consideration of the following description of the invention and the accompanying drawings in which.

DESCRIPTION OF PREFERRED EMBODIMENTS

Figure 1:
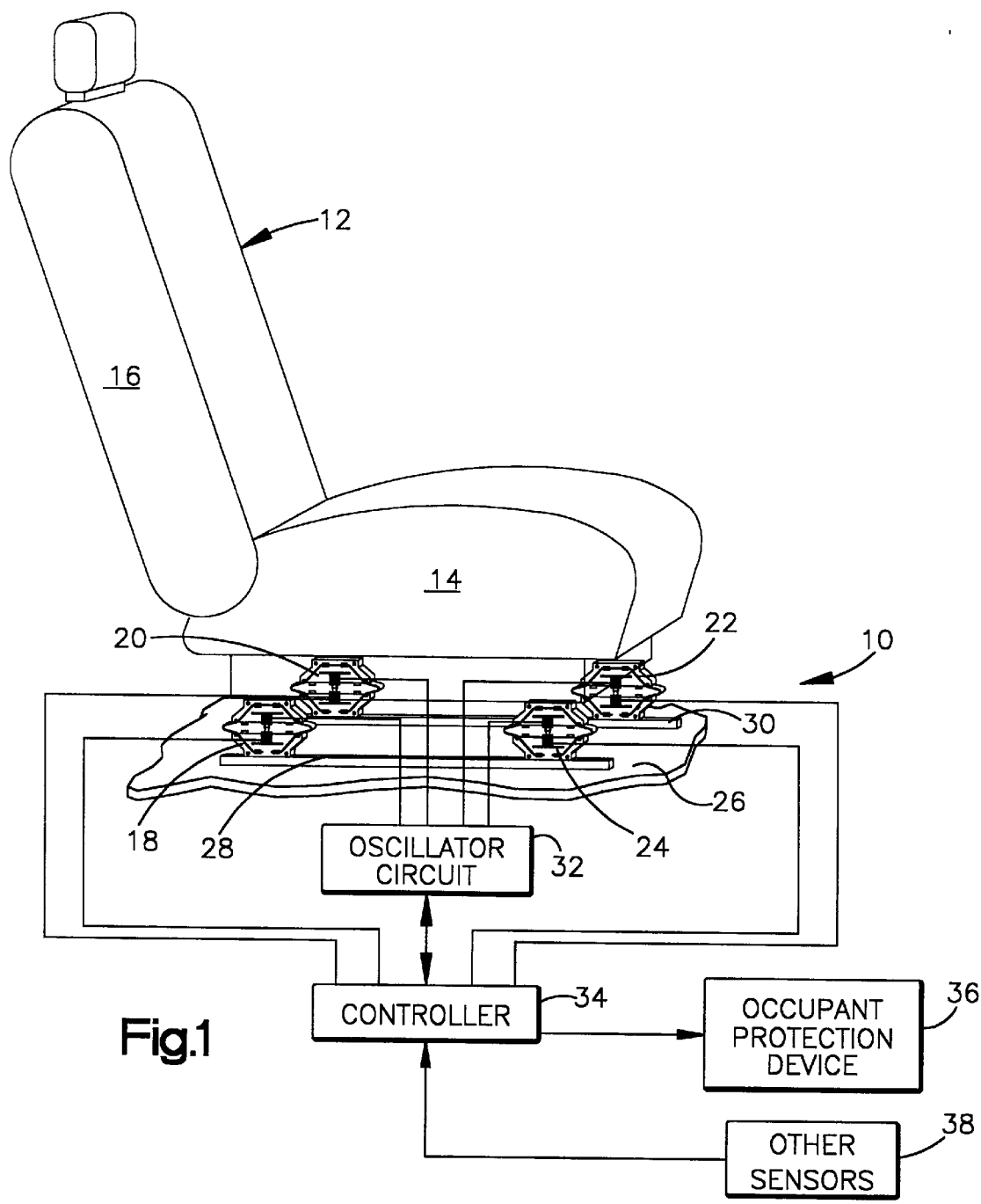
FIG. 1 is a perspective view of a schematic representation of an apparatus in accordance with the present invention.

FIG. 1 illustrates a preferred embodiment of a weight sensing apparatus 10 in accordance with the present invention. The apparatus 10 is operatively connected to a vehicle seat 12. The seat 12 includes a lower seat cushion 14 and a seat back portion 16 extending outwardly from the cushion 14.

The apparatus 10 includes a plurality of substantially identical weight transducer assemblies 18, 20, 22 and 24. The assemblies 18, 20, 22, and 24 are connected between a lower side of the cushion 14 and a lower body portion 26 of the vehicle. Preferably, each assembly 18, 20, 22, and 24 is connected between the cushion 14 and a corresponding seat rail 28 or 30 which are, in turn, secured to the lower body portion 26. Because four transducer assemblies 18, 20, 22, and 24 are used in this preferred embodiment, the load applied to the seat 12 is distributed between such assemblies.

Each transducer assembly 18, 20, 22, and 24 includes a magnetic circuit having a reluctance condition which varies in response to the load applied to the seat 12. The weight of the load applied to the vehicle seat is functionally related to the sum of the reluctance values associated with each transducer assembly 18, 20, 22, and 24. Each such magnetic circuit is driven by an oscillator circuit 32. The oscillator circuit 32 is electrically coupled to a controller 34, which includes suitable demodulator circuitry. The demodulation circuit also could be located external to controller 34.

The controller 34 preferably is a microcomputer. The controller 34 also may include a plurality of discrete circuits, circuit components, an application specific integrated circuit (ASIC) or a combination of discrete circuits, circuit components and/or ASICs configured to accomplish the desired weight determining functions.

In the preferred embodiment illustrated in FIG. 1, the controller 34 is electrically coupled to an actuatable occupant protection device 36, such as, for example, an inflatable air bag module having one or more adjustable features. These adjustable features include one or more actuatable stages and/or vent valves. Through control of the actuatable stages and vent valves, inflation timing, pressure, profile, etc. can be controlled. The actuatable occupant protection device 36 also may include, for example, inflatable seat belts, inflatable knee bolsters, inflatable head liners or side curtains, actuatable head restraints, and knee bolsters operated by inflatable air bags. When the occupant protection device 36 is actuated, it helps to cushion a vehicle occupant during a crash event.

The controller 34 preferably is coupled to other sensors 38. Such other sensors 38 may include, for example, a crash sensor for sensing a vehicle crash event, an occupant position sensor for sensing the position of a vehicle occupant within the vehicle, as well as other sensors which may provide information useful in the actuation of the occupant protection device 36. Preferably, the other sensors 38 includes a crash event sensor in the form of an acceleration sensing device, such as an accelerometer. The accelerometer provides a signal to the controller 34 having an electrical characteristic indicative of crash acceleration of the vehicle. The controller 34 is programmed to control actuation of the protection device 36 in response to both the signals from the transducer assemblies 18, 20, 22 and 24 and the signal, or signals, from the other sensors 38.

Figure 2:
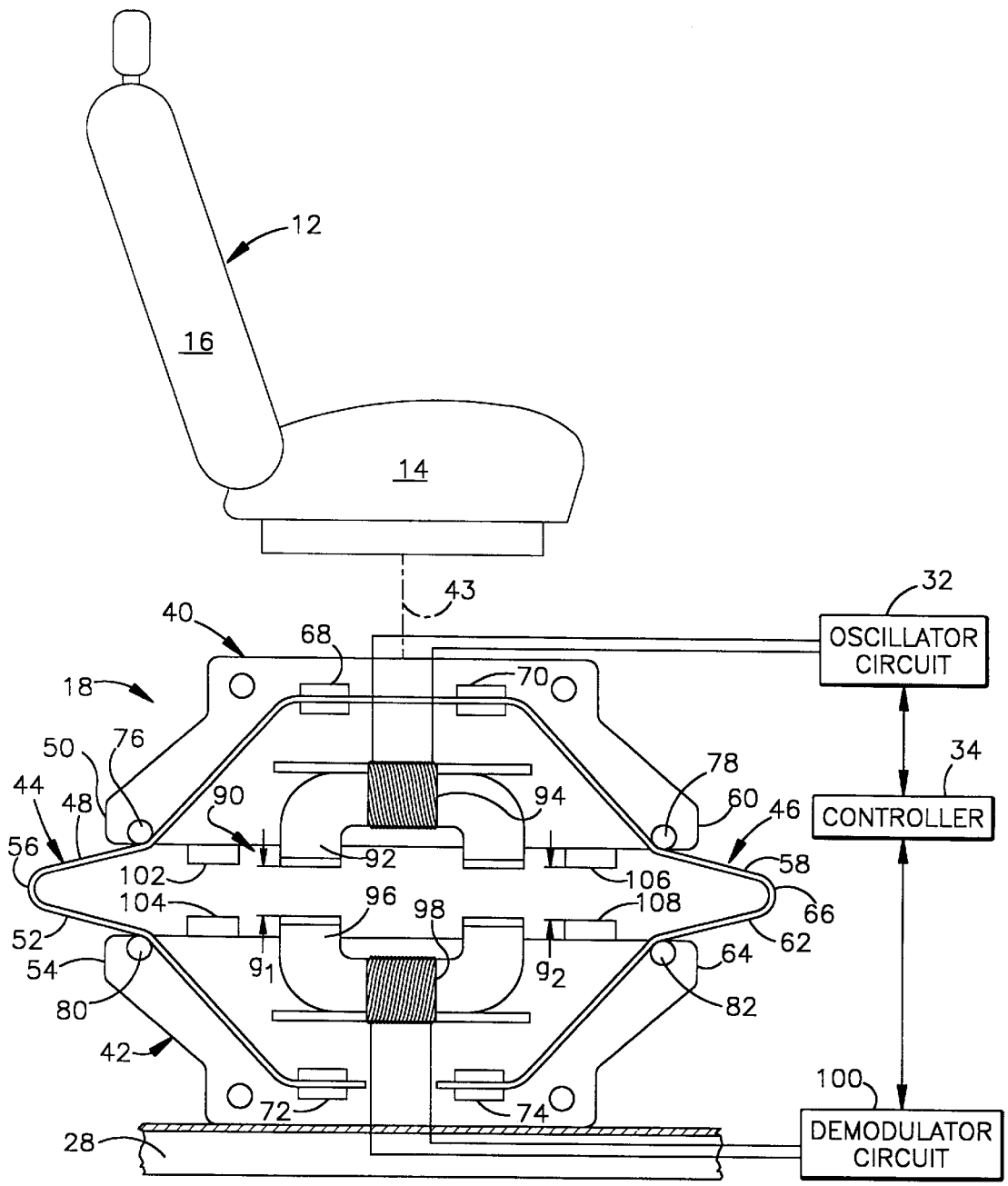
FIG. 2 is an enlarged view of a portion of the apparatus of FIG. 1, illustrating a first embodiment of the apparatus.

FIG. 2 illustrates an enlarged view of the transducer assembly 18 in accordance with a first embodiment of the present invention. The assembly 18 is schematically illustrated as being connected with the seat 12 of FIG. 1. It will be understood and appreciated that, for this embodiment, the structure of the other transducer assemblies 20, 22, and 24 is substantially identical to transducer assembly 18 as shown and described with respect to FIG. 2. A single transducer 18 is illustrated and described for purposes of brevity. The measurable reluctance of each transducer assembly 18, 20, 22 and 24 varies according to the load applied to the vehicle seat 12.

The transducer assembly 18 includes a rigid mounting member 40 positioned opposite and movable relative to another rigid mounting member 42. A central axis 43 extends through the center of the mounting members 40 and 42. The mounting member 40 is schematically illustrated as being operatively connected to the lower seat portion 14, e.g., the bottom seat frame. Similarly, the second mounting member 42 is schematically illustrated as being slidably connected to the seat rail 28. Thus, the pair of mounting members 40 and 42 of the assembly 18 are connected between the vehicle seat 12 and the lower body portion 26 of the vehicle. It will be understood and appreciated that transducer 18 could be located at various other locations associated with seat 12 and is preferably located at one of the corners.

A pair of spaced apart and opposed guide elements 44 and 46 are connected between the first and second mounting members 40 and 42. The guide elements 44 and 46 guide relative movement between the first and second mounting members 40 and 42. The guide elements 44 and 46 are made from a spring material, such as spring steel, so as to mechanically urge a spaced apart relationship between the first and second mounting members 40 and 42, respectively.

The first guide element 44 is formed of an arm 48 extending from a first side 50 of mounting member 40 and an arm 52 extending from a first side 54 of second mounting member 42. A bend portion 56 interconnects the first and second arms 48 and 52 to define a leaf spring attached between mounting members 40 and 42. Accordingly, arm 48, arm 52, and first bend portion 56 cooperatively guide relative movement between the first and second mounting members 40 and 42, respectively. The guide element 44 also urges a predetermined spaced apart relationship between mounting members 40 and 42 according to its spring constant. The guide element 44 also resists compression between first and second mounting members 40 and 42 upon application of an applied load to seat 12.

Similarly, the second guide element 46 is defined by an arm 58 extending from a second side 60 of first mounting member 40 and an arm 62 extending from a second side 64 of second mounting member 42. A bend portion 66 interconnects the arms 58 and 62 to define a leaf spring, which also guides relative movement between first and second mounting members 40 and 42 in a direction generally parallel to the axis 43. The leaf spring defined by arms 58 and 62 and bend portion 66 cooperatively urge a spaced apart relationship between first and second mounting members 40 and 42. The leaf spring also impedes compression between the mounting members 40 and 42 upon application of the applied load.

FIG. 2 illustrates the guide elements 44 and 46 as formed of a single leaf spring of unitary construction. The leaf spring is mounted to the mounting members 40 and 42 by respective spring support members 68, 70, 72, and 74. Load bearing fulcrum supports 76, 78, 80, and 82 are disposed at the opposed faces of the mounting members 40 and 42 adjacent side portions 50, 60, 54, and 64 of the respective mounting members 40 and 42. The fulcrum supports 76, 78, 80, and 82 provide fixed supports which engage respective arms 48, 58, 52, and 62 of the leaf spring to urge apart the mounting members 40 and 42 generally along the axis 43 as well as to resist compression between the mounting members.

Each of the guide elements 44 and 46 preferably has a known and substantially equal spring constant, thereby providing balanced compression and expansion characteristics as a load is applied to the seat 12. No load applied to the seat 12, such as occurs during the absence of a vehicle occupant, defines a zero weight condition. This information (obtained through testing) is suitably preprogrammed and stored in the controller 34. The controller 34 utilizes this information in combination with information received from the other sensors 38 to control actuation of the occupant protection device 36.

A sensor element 90 also is positioned between the mounting members 40 and 42 separate from and suitably intermediate the guide elements 44 and 46. Preferably, the sensor element 90 detects relative position between mounting members 40 and 42 along the axis 43. The sensor 90 includes a first U-shaped core member 92 formed of a ferromagnetic material, such as iron or steel, and attached to and extending from the first mounting member 40. The core 92 has a predetermined plurality of coil windings 94 circumferentially wound around at least a base portion of the exterior surface of the core 92. The core 92 is illustrated as being generally U-shaped, although other configurations may be used.

The core 92 has a known relative magnetic permeability ($\mu_r$). The ends of the coil windings 94 are electrically coupled to the oscillator circuit 32. The oscillator circuit 32 is controlled by the controller 34. The oscillator circuit 32 provides an alternating electrical current through the coil windings 94, which creates magnetic flux lines adjacent the core 92.

The sensor 90 also includes a second U-shaped core member 96 formed of a ferromagnetic material, such as iron or steel, and attached to and extending from the second mounting member 42. The core 96 also has a known relative magnetic permeability ($\mu_r$), which preferably is the same as the magnetic permeability as core 92. The core 96 includes a plurality of coil windings 98 wound around at least a base portion of the exterior surface of the core member 96. The core 96 is illustrated as being generally U-shaped, although other configurations may be used.

The core 96 preferably is substantially identically configured to core 92. The core 96 is secured to the mounting member 42 and is positioned directly opposite to the core 92. The opposed ends of each core 92 and 96 are spaced apart according to the relative spacing between the mounting members 40 and 42. The core-to-core spacing is indicated as gaps g1 and g2. Preferably, a plurality of opposed stops 102, 104, and 106, 108 are provided to limit the maximum amount of compression between the mounting members 40 and 42, which conveniently protect the core members 92 and 96. The distance between opposed stops 102, 104 and 106, 108 is less than the gaps g1 and g2. Limit stops (not shown) may also be used to limit expansion of the assembly 18 if the mounting members 40 and 42 are urged apart.

The ends of the coil windings 98 are attached to a demodulator circuit 100, which, in this embodiment, is illustrated as being located external to and electrically coupled with the controller 34. The demodulator circuit 100 appropriately demodulates the signal induced between the coil windings resulting from the mutual inductance between the coils 94 and 98. The mutual inductance and, in turn, the value of the demodulated signal provided to the controller 34 is a function of the core spacing. The core spacing is a function of the applied load experienced by the transducer assembly 18. Because the spaced apart relationship of guide elements 44 and 46 changes a predetermined amount for a given load in accordance with the spring constants of guide elements 44 and 46, a weight value may be determined in response to the spacing between mounting members 40 and 42.

Specifically, the output voltage induced though mutual induction between the coil windings 94 and 98 is a function of the total reluctance ($R_{tot}$) of the magnetic circuit formed by the cores 92 and 96 and their respective coil windings 94 and 98. The total reluctances ($R_{tot}$) varies in response to the spacing g1 and g2 between the end portions of the cores 92 and 96. The total reluctance may be expressed as:

$$R_{tot} = R_m + R_g \quad \text{(Eq. 1)}$$

where $R_m$=the reluctance of the magnetic path length or core, and $R_g$=the reluctance of the air gap between the cores.

From a basic transformer equation, $R_{tot}$ of equation 1 may be further expressed as:

$$R_{tot} = l_m/(\mu_o \mu_r A_c) + l_g/(\mu_o A_c) \quad \text{(Eq. 2)}$$

where $l_m$=magnetic path length (m), $\mu_o$=magnetic permeability of air
=400 $\pi * 10^{-9}$ (Hm$^{-1}$), $\mu_r$=magnetic permeability of the core material (dimensionless), $l_g$=air gap length (m), and $A_c$=cross sectional area of the core (m$^2$).

The length of the magnetic path ($l_m$) and, thus, the reluctance due to the magnetic path length $R_m$ are fixed quantities. The values of $l_m$ and $R_m$ are determined for the particular configuration of the cores 92 and 96. Accordingly, as the air gap $l_g$ changes, there is a corresponding change in $R_{tot}$. The value of $l_g$, which corresponds to $g_1$ and $g_2$ in FIG. 2, changes according to spacing between the mounting members 40 and 42. Displacement versus reluctance ($R_{tot}$) provides a substantially linear relationship for small air gap lengths. For small air gap lengths, errors due to fringing may be neglected. Accordingly, for core pieces of known dimensions and having a predetermined number (N) of coil windings, one may derive $R_{tot}$ and, in turn, determine the spacing between the mounting members 40 and 42 based upon the value of the total reluctance. Because the spring constants of guide elements 44 and 46 also are known, the applied load and, thus, weight on seat 12 may then be determined.

The induced voltage signal across windings 98 is demodulated at demodulator 100. The value of $R_{tot}$ is functionally related to the voltage across coil windings 98. The induced voltage may be expressed as:

$$V = 4 F f A_c B N * 10^{-8} \quad \text{(Eq. 3)}$$

Where:

F=a form factor (dimensionless)

f=the frequency of the applied Signal (Hz)

$A_c$=the cross sectional area of the magnetic circuit (m$^2$)

B=flux density (T)

N=number of turns of the considered winding

V=voltage across the considered winding (v)

It is well known that B can be expressed as $$B = \phi/A_c = \mu_o \mu_r N I/(A_c * R_{tot}) \quad \text{(Eq. 4)}$$

Thus, through substitution, the total reluctance ($R_{tot}$) can be reduced to $$R_{tot} = 4 F f A_c N * 10^{-8}/(A_c * V) \quad \text{(Eq. 5)}$$

It will thus be appreciated that the reluctance is conveniently determined by monitoring the induced voltage (V) of Eq. 5. The air gaps g1 and g2 between the cores 92 and 96 is easily calculated from the total reluctance $R_{tot}$. From these values, a corresponding weight value may be determined by the controller 34. The controller 34 suitably is programmed to determine the corresponding weight value, which may be determined from calculation or from use of an associated look-up table.

It will be understood and appreciated that each of the other transducer assemblies 20, 22, and 24 function similarly to assembly 18 described above. They each provide appropriate output signals to corresponding demodulation circuitry. The outputs of such demodulation circuitry are provided to the controller for a determination of a change in relative spacing between each of the mounting members of assemblies 18, 20, 22, and 24. The controller 34 determines a weight value according to the applied load in response to the monitored reluctance condition of each associated assembly 18, 20, 22, and 24.

Figure 3:
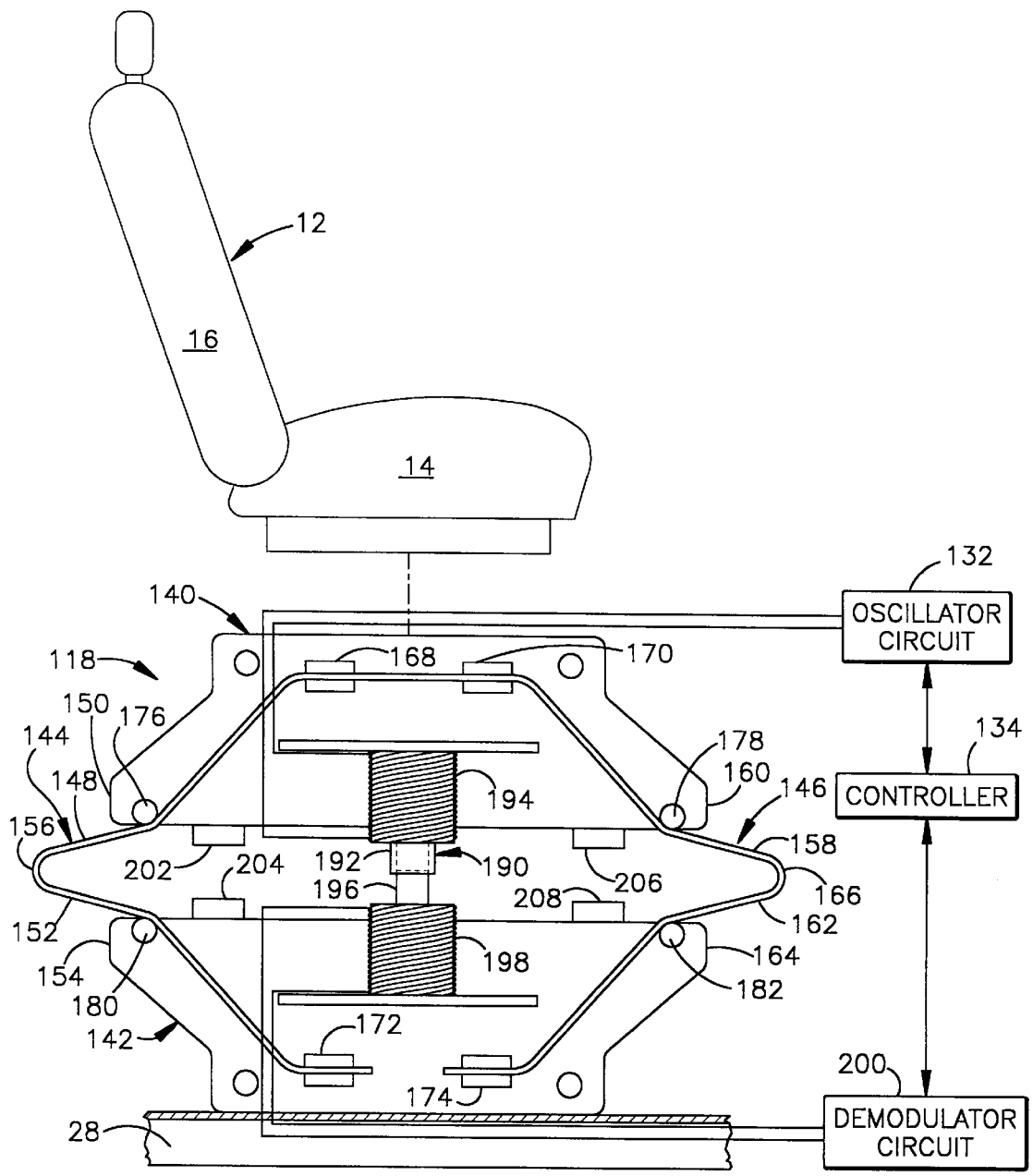
FIG. 3 is an enlarged view of a portion of the apparatus of FIG. 1, illustrating a second embodiment of the apparatus.

Another embodiment of the present invention is illustrated in FIG. 3, in which similar reference numbers, increased by adding 100, refer to similar parts of the transducer assembly shown in FIG. 2. A transducer assembly 118 illustrated is substantially identical to the transducer assembly 18 shown in FIG. 2. However, rather than a pair of opposed U-shaped sensor members (as in FIG. 2), a plunger sensor assembly 190 is used to provide a measurable, load-sensitive, variable reluctance condition. The transducer assembly 18 is schematically illustrated as being attached to the seat 12 of FIG. 1.

The sensor element 190 is operatively positioned between mounting members 140 and 142 in a spaced apart manner due to the guide elements 144 and 146. Preferably, the sensor element 190 detects the relative position of the mounting members 140 and 142 along the central axis extending through the mounting members. The sensor 190 includes a first cylindrical core 192 of a ferromagnetic material, such as iron or steel, affixed to the first mounting member 140. The core 192 has a predetermined plurality of coil windings 194 circumferentially wound around the exterior surface of the core 192. The core 192 also has a hollow cylindrical bore formed in the core, which extends from its distal end towards mounting member 140. The core 192 has a known relative magnetic permeability. The ends of the coil windings 194 are electrically coupled to an oscillator circuit 132. The oscillator circuit 132, which may be controlled by the controller 134, provides an alternating electrical field to the coil winding 194. The coil 194 and core 192 assembly generates magnetic flux lines adjacent the core 192.

The sensor further 190 includes another cylindrical core 196 of a ferromagnetic material, such as iron or steel, attached to and extending from the second mounting member 142. The core 196 also has a known relative magnetic permeability, which preferably is the same as core 192. The core 196 is positioned coaxial with the core 192. The core 196, which may be a solid member, has an outer diameter that is less than the inner diameter of the bore of the core 192. Accordingly, the core 196 is insertable within core 192. The amount of insertion varies according to the relative spacing between the mounting members 140 and 142 which is a function of the load on the seat and the spring force guide elements 144 and 146. The amount of insertion modifies the reluctance condition of the magnetic circuit formed by cores 192 and 196. The core 196 includes a plurality of coil windings 198 wound around at least a substantial portion of the exterior surface of the core member 196. The transducer assembly 118 includes a plurality of opposed stops 202, 204, 206 and 206, 208 to limit the amount of compression between the mounting members 140 and 142 to protect the core members 192 and 196. The stops 202, 204 and 206, 208 will engage before the core 196 bottoms out in the bore of core 192. Over range limit stops (not shown) also may be used to limit the expansion of the assembly 118 in the event that mounting member 140 and 142 are urged away from each other.

Figure 4:
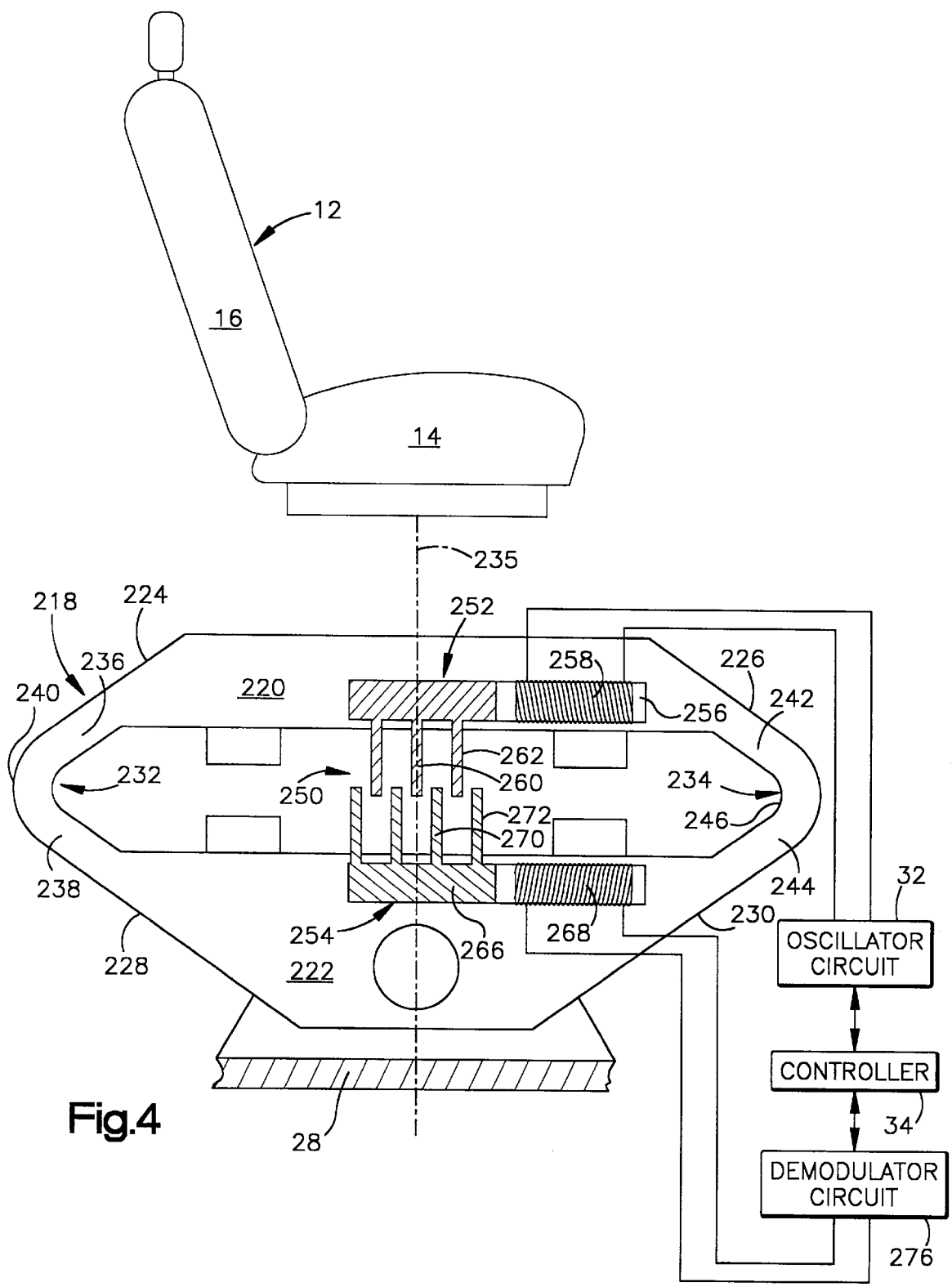
FIG. 4 is an enlarged view of a portion of the apparatus of FIG. 1, illustrating a third embodiment of the apparatus.

FIG. 4 illustrates another embodiment the apparatus 10 in accordance with the present invention. In this embodiment, a transducer assembly 218 includes a pair of spaced apart opposed mounting members 220 and 222. The mounting member 220 is schematically shown as mounted to the lower portion of cushion 14. Mounting member 222 similarly is schematically illustrated mounted to the seat rail 28 of the lower body portion of the vehicle. The mounting member 220 includes side edges 224 and 226. Similarly, mounting member 222 has side edges 228 and 230 positioned opposite side edges 224 and 226 of mounting member 220. The transducer assembly 218 is schematically illustrated as being connected with the seat 12 of FIG. 1.

A pair of spaced apart and opposed guide elements 232 and 234 are connected between side edges 224, 228 and 226, 230 of mounting members 220 and 222, respectively. Guide elements 232 and 234 guide relative movement between first and second mounting members 220 and 222 generally along an axis 235 extending through the center of mounting members 220 and 222. Guide elements 232 and 234 may be formed integrally with the mounting members 220 and 222, as shown, or they may be affixed to the respective mounting members by any suitable means. Guide elements 232 and 234 preferably are mechanically biased with a predetermined spring constant for urging the spaced apart relationship between the mounting members 220 and 222. Guide elements 232 and 234 are preferably made from a spring material such as spring steel.

Guide element 232 is formed of a resilient arm 236 connected to first mounting member side edge 224, a resilient second arm 238 connected to second mounting member first side 228, and a resilient bendable portion 240 interconnecting arms 236 and 238. Arms 236 and 238 and bend portion 240 define a leaf spring, which urges a spaced apart relationship between mounting members 220 and 222 and impedes the relative movement between mounting members 220 and 222 as a load is applied to the seat 12.

Similarly, guide element 234 is formed of a resilient arm 242 extending from the first mounting member, second side 226, a resilient arm 244 extending from second mounting member, second side 230, and a bend portion 246 interconnecting arms 242 and 244. Arms 242 and 244 and bendable portion 246 are made from a spring material, e.g., spring steel, and define a leaf spring, which urges a spaced apart relationship and impedes relative movement between first and second mounting members 220 and 222, respectively.

Preferably, the leaf springs defined by the respective guide elements 232 and 234 have the same predetermined spring constant and provide for balanced compression and deflection characteristics as a load is applied to seat 12. For example, a suitable amount of deflection is about 0.04 inches of compression in response to a load of about 350 lbs. applied to the vehicle seat 12 with such assemblies at each of the four corners.

A sensor 250 is operatively positioned between first and second mounting members 220 and 222. The sensor 250 has a variable reluctance condition responsive to the relative position of the first and second mounting members 220 and 222, respectively. The reluctance condition of the sensor 250 varies as a function of the spaced apart relationship between first and second mounting members 220 and 222 which is a function of the applied load. The sensor 250 provides a reluctance signal having a value indicative of the applied load on the vehicle seat.

In the embodiment illustrated in FIG. 4, the sensor 250 is formed of spaced apart core assemblies 252 and 254, which are fixed to the first and second mounting members 220 and 222, respectively. Consequently, the core assemblies 252 and 254 move relative to each other upon relative movement between the mounting members 220 and 222.

The first core assembly 252 is attached to mounting member 220 in any suitable manner and includes an elongated body portion 256, suitably made from a ferromagnetic material. A plurality of coil windings 258 are wound around a substantial part of the body portion 256. At least one and preferably a plurality of spaced apart fingers 260 and 262 extend outwardly from the body portion 256 spaced from the coil windings 258. Three such fingers are shown for explanation purposes only. The coil windings 258 are electrically coupled to the oscillator circuit 32, which is controlled by the controller 34.

The second core assembly 254 similarly includes an elongated body portion 266 made from a ferromagnetic material and attached to mounting member 222 by any suitable means. At least a substantial portion of the body portion 266 includes a plurality of circumferentially wound coil windings 268. At least one and preferably a plurality of fingers 270 and 272 extend from the body portion 266 at a position distal from the coil windings 268. The fingers 270 and 272 are offset from opposite the fingers 260 and 262. All fingers 260, 262, 270, and 272 are substantially parallel with the axis 235 and offset to allow the fingers of 252 to be received between adjacent pairs of fingers of the core member 254. Core members 252 and 254 form part of a magnetic circuit having a reluctance condition, which varies in response to the spacing between mounting members 220 and 222 which is, in turn, a function of the load on the seat.

The oscillator circuit 32 provides an alternating current to the coil windings 258, which, through mutual inductance, induces a voltage from the core 258 to the adjacent core 254 and the coil windings 268. The induced voltage signal is functionally related to the total reluctance of the magnetic circuit formed by coil assemblies 252 and 254. The coil windings 268 are electrically connected to a demodulator circuit 276 which demodulates the sensed voltage signal from the coil windings 268. The demodulated signal suitably is filtered, amplified, and provided to the controller 34. Controller 34 determines the load sensed by the transducer assembly 18, in response to the total reluctance of the magnetic circuit formed by the core assemblies 252 and 254, such as described above.

From the above description of the invention, those skilled in the art will perceive improvements, changes and modifications. Such improvements, changes and modifications within the skill of the art are intended to be covered by the appended claims.

Having described the invention, the following is claimed:

1. A weight sensing apparatus for sensing a load applied to a vehicle seat, said apparatus comprising:

a first mounting member mountable to a vehicle seat;

a second mounting member mountable to a stationary body member of the vehicle and positioned opposite from and movable relative to said first mounting member;

a pair of spaced apart and opposed guide elements connected between said first and second mounting members, said pair of guide elements guiding relative movement between said first and second mounting members;

biasing means connected between said first and second mounting members for urging a spaced apart relationship between said first and second mounting members;

a sensor element positioned between said first and second mounting members separate from said first and second guide elements, said sensor element having a variable reluctance condition functionally related to the relative spacing between said first and second mounting members, said sensor element providing a signal indicative of said reluctance condition and the load on the seat.

2. The apparatus of claim 1 wherein said sensor element further comprises a first part connected to said first mounting member and a second part connected to said second mounting member, said first and second parts being substantially coaxial and cooperatively providing a variable reluctance condition which changes in response to the relative spacing between said first and second mounting members and, in turn, said applied load, said sensor element providing a signal indicative of the applied load and the load on the seat in response to the reluctance condition of said first and second parts.

3. The apparatus of claim 1 wherein said biasing means and said pair of guide elements are integrally formed from spring material.

4. The apparatus of claim 3 wherein
   a first of said guide element further comprises a first leaf spring connected between said first and second mounting members; and
   a second of said guide elements further comprises a second leaf spring connected between said first and second mounting members, said second leaf spring being spaced apart from said first leaf spring.

5. The apparatus of claim 1 further comprising a controller electrically coupled to said sensor element for determining a weight value on the seat in response to said sensor element signal.

6. The apparatus of claim 5 further comprising an actuatable occupant protection device electrically coupled to said controller for, when actuated, protecting a vehicle occupant in a crash event, said controller controlling actuation of said protection device in response to said weight value.

7. A weight sensing apparatus for a vehicle comprising:
   a first mounting member mountable to a vehicle seat and having first and second opposed side portions;
   a second mounting member mountable to a vehicle body portion and having first and second opposed side portions positioned opposite said side portions of said first mounting member, said second mounting member being movable relative said first member along an axis extending through said first and second mounting members intermediate said respective side portions;
   a first arm extending from said first side of said first mounting member
   a second arm extending from said first side of said second member,
   a first bend portion interconnecting said first and second arms, said first arm, said second arm, and said first bend portion guiding relative movement between said first and second mounting members in a direction generally parallel to said axis, said first arm, said second arm, and said first bend portion urging a predetermined spaced relationship between said mounting members and impeding relative movement between said first and second mounting members upon application of said applied load;
   a third arm extending from said second side of said first mounting member;
   a fourth arm extending from said second side of said second mounting member,
   a second bend portion interconnecting said third and fourth arms, said third arm, said fourth arm, and said second bend portion guiding relative movement between said first and second mounting members in a direction generally parallel to said axis, said third arm, said fourth arm, and said second bend portion urging a predetermined spaced relationship between said first and second mounting members and impeding said relative movement between said first and second mounting members upon application of said applied load; and
   a sensor positioned between said first and second mounting members having a variable reluctance condition responsive to the relative position of said first and second mounting members, said reluctance condition changing in response to said spaced relationship between said first and second mounting members and, in turn, said applied load, said sensor providing a signal indicative of said applied load in response to said reluctance condition.

8. The apparatus of claim 7 wherein said first arm, said second arm, and said first bend portion form a first leaf spring having a predetermined spring constant.

9. The apparatus of claim 8 wherein said third arm, said fourth arm, and said second bend portion form a second leaf spring having a predetermined spring constant substantially equal to that of said first leaf spring.

10. The apparatus of claim 7 further comprising a controller electrically coupled to said sensor for determining a weight value in response to said sensor signal.

11. The apparatus of claim 10 further comprising an actuatable occupant protection device electrically coupled to said controller for, when actuated, protecting a vehicle occupant in a crash event, said controller controlling actuation of said protection device in response to said weight value.

* * * * *